United States Patent [19]

Yamashita et al.

[11] Patent Number: 5,552,860
[45] Date of Patent: Sep. 3, 1996

[54] MONITORING SYSTEM IN AUTO-RESTORING IMAGE REPRODUCING SYSTEM

[75] Inventors: Yuji Yamashita; Jiro Nagira; Yasuhiro Hashimoto; Fumio Aizawa, all of Osaka, Japan

[73] Assignee: Mita Industrial Co., Ltd., Osaka, Japan

[21] Appl. No.: 560,789

[22] Filed: Nov. 21, 1995

[30] Foreign Application Priority Data

Nov. 30, 1994 [JP] Japan .................................. 6-297681

[51] Int. Cl.⁶ ........................... G03G 15/00; G03G 21/00
[52] U.S. Cl. ...................... 355/207; 364/187; 364/276.3; 395/180; 395/182.13
[58] Field of Search .................................... 355/204, 205, 355/207, 208; 395/180, 182.13, 185.01; 364/187, 276.3

[56] References Cited

U.S. PATENT DOCUMENTS

| 5,239,547 | 8/1993 | Tomiyama et al. | 355/207 X |
| 5,396,314 | 3/1995 | Umeda et al. | 355/207 |
| 5,446,523 | 8/1995 | Shimomura et al. | 355/207 |
| 5,463,545 | 10/1995 | Umeda et al. | 364/187 |

OTHER PUBLICATIONS

A Design Methodology for Control–type Self–maintenance Machines (1994), Yasushi Umeda et al.

*Primary Examiner*—Matthew S. Smith
*Assistant Examiner*—Sophia S. Chen
*Attorney, Agent, or Firm*—Shinjyu Office of Patent Attorneys

[57] ABSTRACT

For an image reproducing system provided with an auto-restoration capability, a monitoring system is disclosed involving display by an image reproducing machine of the system in connection with fault diagnosis and auto-restoration processes by the image reproducing machine. The disclosed monitoring system in particular concerns a network of likewise auto-restoring image reproducing machines in communication with a host computer. The image reproducing machine has machine-condition constant-monitoring sensors through which a main controller of the image reproducing machine detects faults causing operational malfunction. A communication device transmits data indicating operational malfunction in an image reproducing machine from its main controller to the host computer. The main controller prepares and executes an auto-restoration process implementing restorative operations to compensate functionally for the detected faults, and interprets as restorative state data success of implemented restorative operations. A restoration process data storage of the image reproducing system stores data identifying an executed auto-restoration process. The restoration process data and the restorative state data are displayed by an image reproducing system display, which display can be by the host computer, as monitored at a remote service station by a service engineer.

23 Claims, 5 Drawing Sheets

MONITORING SYSTEM IN AUTO-RESTORING IMAGE REPRODUCING SYSTEM

BACKGROUND OF THE INVENTION

1. Technical Field

The present invention relates to image reproducing apparatuses provided with auto-restoration capabilities, and in particular relates to monitoring and display of auto-restoring functions in such image reproducing apparatuses.

2. Description of Related Art

Auto-restoration capabilities in image reproducing apparatuses such as photocopying machines, facsimile devices and page printers are known. Auto-restoration capabilities enable the image reproducing apparatuses to resume operations despite minor machine malfunctions. Auto-restoring image reproducing apparatuses, wherein normal machine performance has been impeded due to mechanical or like trouble, can automatically regain minimum requisite functions by executing various restorative operations.

Machine operating conditions are constantly monitored in auto-restoring image reproducing apparatuses. When it is thus determined that there has been machine a malfunction, the type of fault is diagnosed. According to the fault diagnosis, the controller formulates a restoration plan which will fulfill functional operability of the device. The controller then directs the machine to execute restorative, usually compensatory, operations according to the restoration plan. After restorative operations have been finished, a machine operating panel displays the fact that recovery from a malfunction has been accomplished by auto-restoration.

Functional operability does not mean complete restoration of the image reproducing apparatus to its normal operating condition prior to malfunction. Rather, functional operability is recovery, properly only temporary, of requisite machine functions following malfunction. Machine functions are recovered by restorative operations which, for example, compensate for a malfunctioning component.

More specifically, in image reproducing apparatuses having this sort of auto-restoration capability, depending on the nature of the fault, there are instances in which machine operations are restored from a malfunction condition by controlling select components associated with the malfunctioning part to operate abnormally.

If the developing roller in a photocopying machine, for example, does not conduct development bias satisfactorily, the result may be overly dark, faulty copy images. In this case, increasing above normal control threshold the amount by which the exposure unit exposes the photoconductor drum, and reducing below normal control threshold the voltage at which the main charger charges the photoconductor drum can serve to maintain machine functionality. Since operability is only restored temporarily in such cases, maintenance work, (replacing the developer unit, for example), must be carried out by a service engineer in order to enable the machine control functions to return to normal.

Accordingly, with image reproducing apparatuses having an auto-restoring function as described above, the operating panel displays the fact that auto-restoration has enabled the machine to recover from a malfunction. Nevertheless, since functionality has been restored and the image reproducing apparatus appears on the surface to be operating normally, a photocopying machine user may neglect to contact a service engineer. Subsequently, in the event the same malfunction occurs again, the machine may not be able likewise to regain operability through its auto-restoration capability.

A service engineer, when summoned, will carry out maintenance work on the machine making reference to a service manual. In the foregoing example, for instance, the service approach would be based on the observation that the copy images are too dark. However, the cause (i.e., the fact that there is a fault in the developer unit, rather than in the main charger or the exposure unit) would be neither clearly nor immediately understandable, encumbering the maintenance work and making restoration of the machine from its faulty condition more time-consuming than it might be otherwise.

SUMMARY OF THE INVENTION

The object of the present invention is to facilitate maintenance work in an image reproducing system provided with an auto-restoring capability.

An image reproducing system provided with an auto-restoration capability according to the present invention includes an image reproducing machine; a main controller for executing image reproducing and auto-restoration functions of the image reproducing machine; a fault detecting means for detecting faults causing operational malfunction in the image reproducing machine; auto-restoration means for preparing and executing an auto-restoration process implementing restorative operations to compensate functionally for machine faults detected by the fault detecting means; a restoration process data storage means for storing restoration process data identifying an executed auto-restoration process; a restorative operation success-interpreting means for interpreting as restorative state data success of the restorative operations of an auto-restoration process; and a display output means for displaying restoration process data from the restoration process data storage means, and for displaying restorative state data from the restorative operation success-interpreting means.

Furthermore, the image reproducing machine of an image reproducing system in accordance with the present invention is communicable with a host computer in a network with image reproducing machines likewise provided with an auto-restoration capability. Therein, the image reproducing system further includes a communication means for transmitting output from the display output means to a host computer via a transmission line.

The image reproducing system in accordance with the invention further includes a machine-condition monitoring means for continually monitoring the condition of the image-reproducing machine. The fault detecting means detects faults causing operational malfunction in the image reproducing machine based on data from the machine-condition monitoring means.

Furthermore, the machine-condition monitoring means can include the restorative operation success-interpreting means, such that following implementation of restorative operations by the auto-restoration means, the machine-condition monitoring means generates restorative state data indicating whether the restorative operations are successful.

Moreover, in the image reproducing system in accordance with the present invention, the communication means is linked to the machine-condition monitoring means so as to transmit data from the machine-condition monitoring means to the host computer when the fault detecting means detects faults.

In an image reproducing system according to the present invention, when the restorative operations of an auto-restoration process are implemented by the auto-restoration means, restoration process data identifying the executed auto-restoration process is stored in the restoration process data storage means.

Then the restoration process data as well as the restorative state data interpreted by the restorative operation success-interpreting means, is displayed by the display output means.

Herein, by examining the displayed data on restoration processes and interpreted restorative state data, a service engineer can pinpoint the cause of the fault(s) accurately and can repair the device easily even if a fault occurs after auto-restorative operations have restored the machine to functional operability. Thus maintenance work can be facilitated.

In a network of auto-restoring capable image reproducing apparatuses which communicate with a host computer via communications lines, malfunction situations in the image reproducing apparatuses can be determined by the host computer. Accordingly, the fault(s) giving rise to the malfunction in an image reproducing apparatus in question can be recognized remotely. Maintenance work can then be carried out having prepared replacement components in advance, for example. This can further facilitate the maintenance work.

Furthermore, in an image reproducing system in accordance with the present invention, since the image-reproducing machine is continually monitored, faults in the event of machine malfunction can be detected accurately.

Moreover, in an image reproducing system in accordance with the present invention, when the fault-detecting means detects a fault based on data from the machine-condition monitoring means, a communications means communicates data from the machine-condition monitoring means to the host computer. Not only can the host computer indicate that a fault has been detected, but accordingly from the host computer the cause of the fault can be accurately grasped. This can yet further facilitate maintenance work.

These and other objects, features, aspects and advantages of the present invention will become more fully apparent from the following detailed description of the present invention when taken in conjunction with the accompanying drawings, where like reference numerals denote corresponding parts throughout, in which:

DETAILED DESCRIPTION OF THE PREFERRED EMBODIMENT

Figure 1:
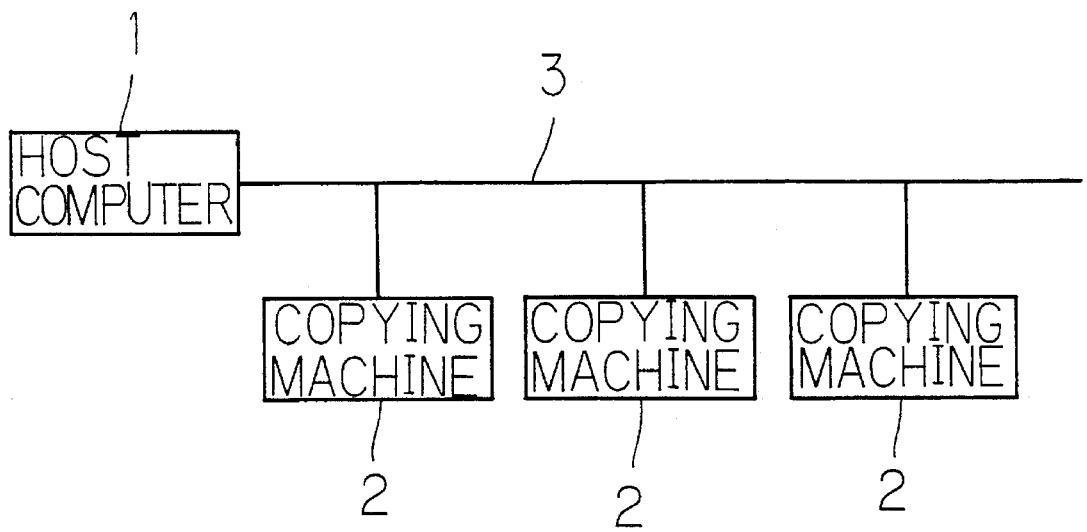
FIG. 1 is a block diagram schematically representing a photocopying machine control network in accordance with one embodiment of the present invention, wherein several photocopying machines are connected electronically to a host computer.

As shown in FIG. 1, a photocopying machine management network includes several photocopying machines 2. The photocopying machines 2, according to one embodiment of the present invention, are connected to a host computer 1 via telephone lines 3. It should be understood that instead of the telephone lines 3, transmission lines in a local area network (LAN), for example, could also serve as network lines.

Figure 2:
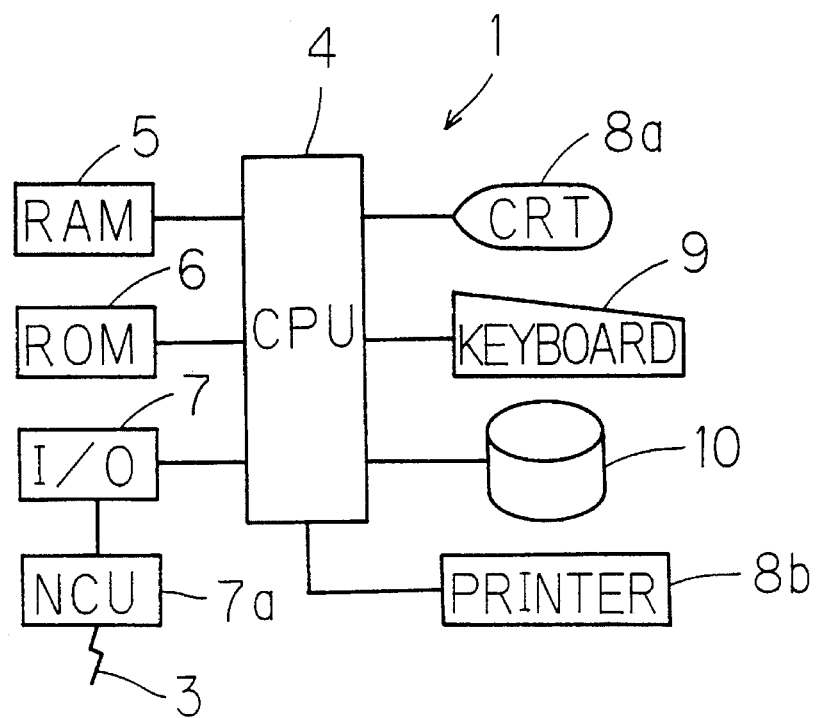
FIG. 2 is a schematic block diagram of the host computer of the control network represented in FIG. 1.

As shown in FIG. 2, the host computer 1 includes a CPU 4, to which are connected a RAM 5 and a ROM 6, and an input/output device 7. A display CRT 8a, a printer 8b, an input keyboard 9 and an external storage device 10 are connected to the CPU 4. The input/output device 7 is provided with a serial interface such as an RS232C. A network control unit (NCU hereinbelow) 7a is connected to the serial interface of the I/O device 7, and further is connected to the telephone line 3.

Figure 3:
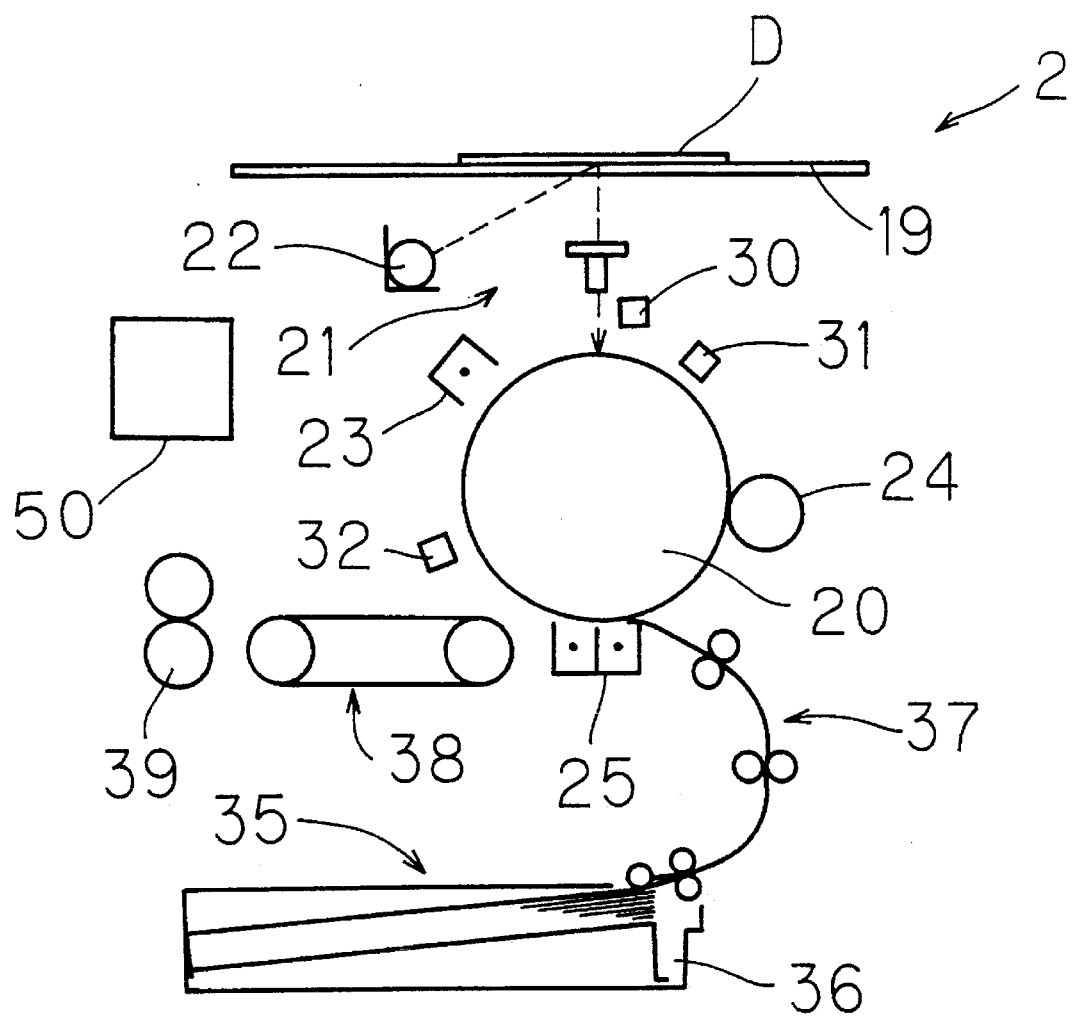
FIG. 3 is a schematic elevational view of an imaging station of one of the photocopying machines depicted in FIG. 1.

As shown in FIG. 3, the photocopying machine 2 contains a centrally disposed photosensitive drum 20. A document glass 19 is provided above the photosensitive drum 20. A document D to be copied is placed on the document glass 19. An exposure unit 21 for document scanning is provided between the document glass 19 and the photosensitive drum 20. The exposure unit 21 includes a halogen lamp (HL) 22 as a light source, and a lens unit. A main charger (MC) 23, a developer unit (DU) 24 and a transfer unit 25, among other components, are disposed around the periphery of the photosensitive drum 20. Further, a photosensor 30, which detects the quantity of light from the halogen lamp 22; a surface potential sensor 31, which detects the surface potential of the photosensitive drum 20; and a toner density sensor 32, which detects the density of toner adhered to the photosensitive drum 20, are disposed around the periphery of the photosensitive drum 20.

A paper supply unit 35 is provided below the photosensitive drum 20. The paper supply unit 35 is provided with a paper supply cassette 36, a paper delivery assembly 37 which delivers paper from the paper supply cassette 36, and a paper discharge device 38 which discharges paper onto which an image has been transferred. A fixing device 39 which fuse-fixes the toner image onto the paper is disposed downstream from the paper discharge device 38.

Figure 4:
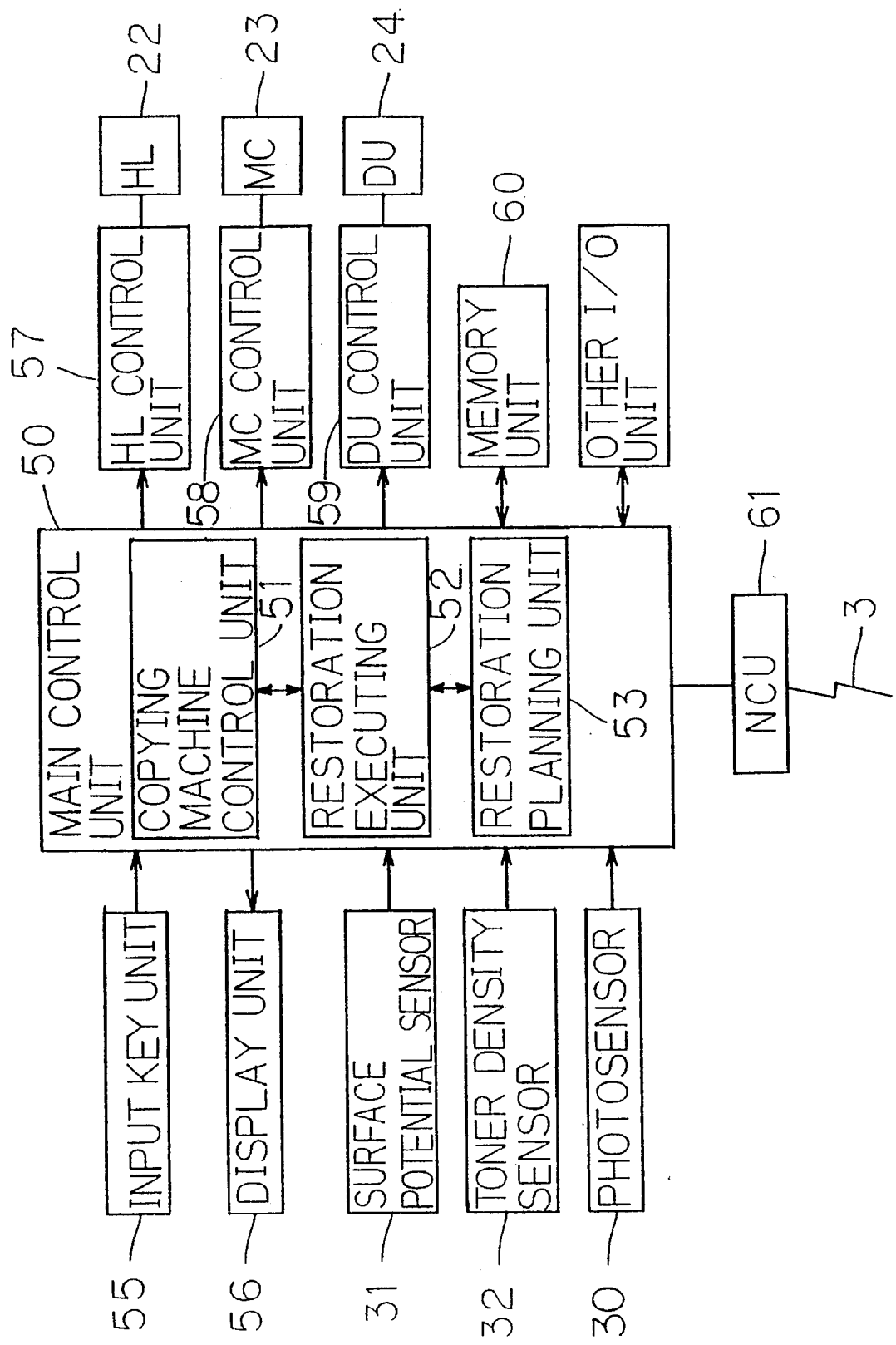
FIG. 4 is a block diagram showing components of a main control system in one of the photocopying machines as depicted in FIGS. 1 and 3, wherein the main control system implements an auto-restoration capability of the photocopying machine.

The photocopying machine 2 is provided with a main control unit 50 as shown in FIG. 4. The main control unit 50 has a photocopying machine control unit 51 which controls the principal photocopying machine operations, a restoration executing unit 52 which executes auto-restoring operations, and a restoration planning unit 53 which formulates an auto-restoration plan.

In the restoration executing unit 52, values from the various sensors are received via the photocopying machine control unit 51 and attributized, and are supplied thus to the restoration planning unit 53. In the restoration planning unit 53, based on the attributized sensor values, malfunction judgement, fault analysis and restoration plan are prepared.

ROM 6 stores fault models based on predetermined acceptable values or ranges for parameters such as development bias, control threshold for exposure by the exposure unit, main charger charging voltage, toner quantity, and fixing unit fusing temperature, for example. The restoration planning unit 53 accomplishes fault analysis by comparing the attributized sensor values with the fault model parameters. Furthermore, the ROM 6 also stores function models, which specify requirements for the different photocopying machine functions.

By correlation with the fault models, selections of necessary functions from among the function models are stored in the ROM 6 as well. These selections represent manifest requirements to maintain machine functionality in modeled fault situations. In preparing a restoration plan, the restoration planning unit analyzes what machine functions are necessary to restore the machine to operability by determining, based on the fault analysis, which manifest requirements are not satisfied.

The restoration plan thus prepared is output to the restoration executing unit 52. The restoration executing unit 52 carries out restorative operations based on the supplied plan.

An input key unit 55, located in an operating panel (not shown) and a display unit 56, as well as the surface potential sensor 31, the toner density sensor 32 and the photosensor 30, are connected to the main control unit 50. Further, an HL (halogen lamp) control unit 57, an MC (main charger) control unit 58, a DU (developer unit) control unit 59, a memory unit 60 and other input/output units are connected to the main control unit 50. The HL control unit 57 is connected to the halogen lamp 22, the MC control unit 58 is connected to the main charger 23, and the DU control unit 59 is connected to the developer unit 24. Further, an NCU 61 is connected to the main control unit 50. The NCU 61 contains a modem and is connected to the telephone line 3. It should be understood, however, that if an alternate communication line is used, the NCU 61 may include a communicating device other than a modem.

In the restoration steps in the auto-restoration operations executed by the restoration executing unit 52, restoration triggering data which has become a restoration trigger, restoration process data, and restoration result data as to whether the restorative operation(s) have been a success, are stored in the memory unit 60.

Following is a description of the operation of the embodiment as structurally detailed above.

If the start of a copying operation has been commanded by manipulation of the input key unit 55, then the halogen lamp 22 of the exposure unit 21 is lighted, and image information is scanned from the document D placed on the document glass 19. Further, paper is supplied from the paper supply cassette 36 to the photosensitive drum 20. A toner image is formed on the photosensitive drum 20 in accordance with the scanned image information, and the toner image thus formed is transferred by the transfer unit 25 onto the supplied paper. The paper discharge device 38 discharges the paper bearing the transferred toner image, meanwhile delivering it to the fixing device 39. In the fixing device 39, the toner image is fuse-fixed onto the paper, which is then discharged.

Figure 5:
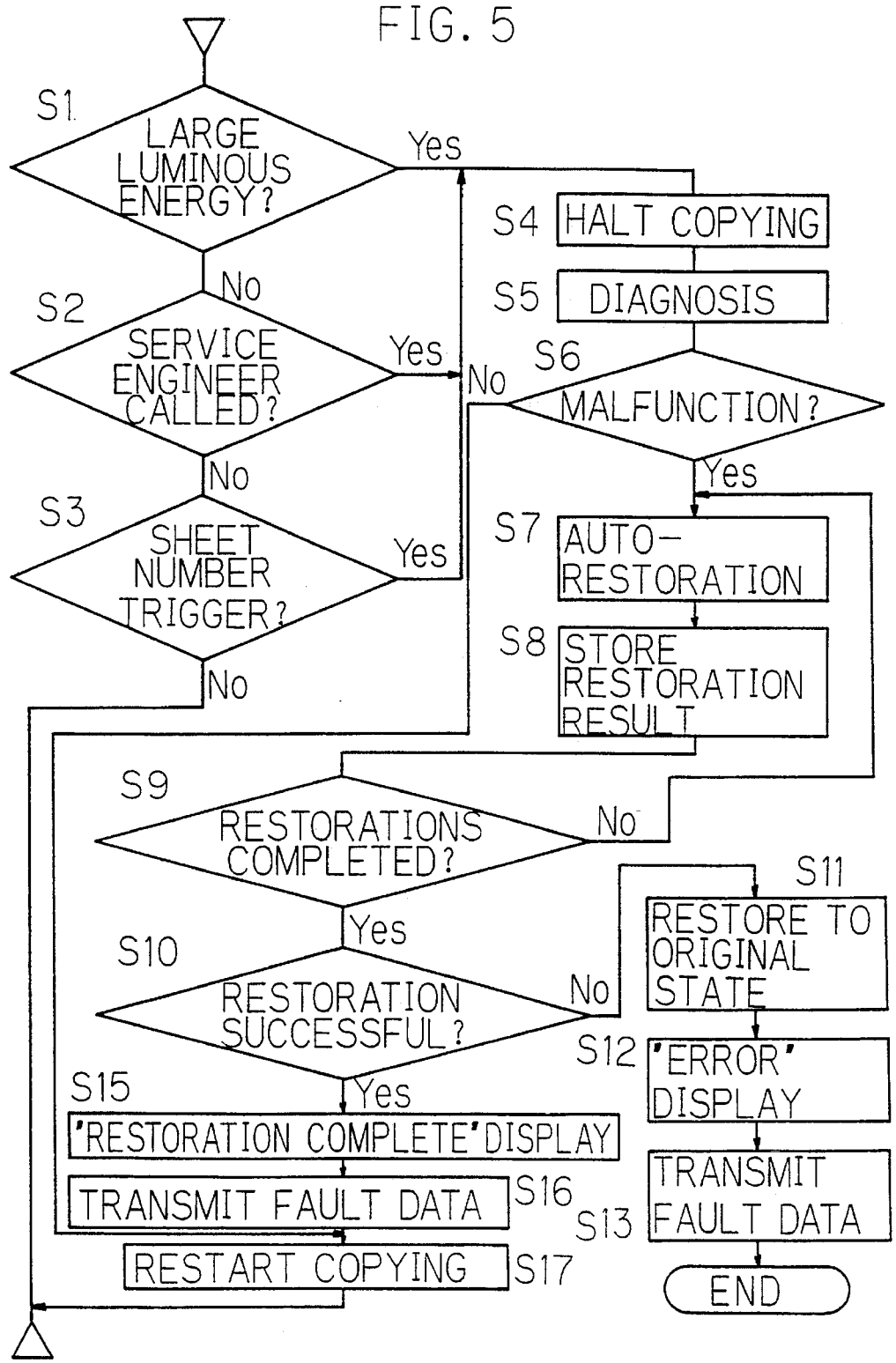
FIG. 5 is a control flow chart illustrating operations performed by the main control system depicted in FIG. 4.

Machine operations are controlled during the copying process in accordance with the control flow diagrammed in FIG. 5. Therein, step S1 of the control process determines whether the luminous energy irradiated by the exposure unit 21 is to be unusually large, depending on whether a luminous energy increase key, which is located in the input key unit 55, has been manipulated a number of times within a predetermined period. In step S2 a decision is made to determine whether a service engineer has been called due to whatever malfunction. In step S3 a decision is made to determine whether a sheet number trigger (a trigger which goes on with every prescribed number of copies) is on. If the result of any of these determinations is "yes" the control process shifts to step S4. In step S4 the copying action is halted. Step S5 executes, by means of input from the surface potential sensor 31, the toner density sensor 32 and the photosensor 30, a self-diagnosis of the current condition of the photocopying machine. Step S6 determines whether the results of the diagnosis indicate that there is a malfunction in photocopying machine operability. If the determination in step S6 is that there is a malfunction, then the control process shifts from step S6 to step S7. In step S7 an auto-restoration process plan is prepared and accordingly restorative operation(s) are executed.

In an instance in which the main controller is to direct an auto-restoration process, initially it derives candidate causes for the malfunction. Fault models are then selected by performing malfunction simulations based on the candidate malfunction causes.

The controller then continues by preparing an auto-restoration plan. Therein, restoration objectives are determined. The restoration objectives are determined from requirements not satisfied among the manifest requirements for all necessary machine functions. The necessary machine functions in a given instance of malfunction are stored in the ROM 6, selected in advance from among the function models, by correlation with the fault models. One of the restoration objectives which have been determined is then selected.

Candidate restorative operation(s) to meet the selected restoration objective are derived from parameters among the fault models and know-how on restorative operations. As a restoration model, the photocopying machine condition following execution of the selected candidate restorative operation(s) is then derived by a simulation technique.

Restoration models for each restoration objective in turn are thus evaluated, and the candidate restorative operation(s) which fulfill the most restoration objectives and which also have the least amount of side effects are selected.

The auto-restoration process is executed for the candidate restorative operation(s) which thus have been selected.

In step S8, restoration process data identifying the auto-restoration process thus executed is stored.

In step S9 it is determined whether the auto-restoration process has been completed. If there are a plurality of candidate restorative operations under the auto-restoration plan, the control process returns to step S7 and the next restorative operation is executed.

If it is determined that the auto-restoration process has been completed, the control process shifts to step S10. In step S10 it is determined whether the auto-restoration process was successful.

The controller then directs the photocopying machine to carry out an auto-check or an auto-test run as needed to monitor the outcome of the auto-restoration process. The restored state resulting from the executed auto-restoration process as monitored by the various sensors is stored as restorative state data.

Herein, the photocopying machine optionally may include machine restorative state sensors in communication with the main controller such that when the auto-restoration process has been completed, in step S10 the main controller interprets data from the machine restorative state sensors as restorative state data indicating whether the restorative operations are successful. In other words, the restorative operation success-interpreting means can be exclusive of the machine-condition monitoring means.

Wherein the photocopying machine is provided with machine restorative state sensors, on the other hand these may be employed together with the constant-monitoring sensors in monitoring the restored state of the photocopying machine as restorative state data.

In case the auto-restoration process was not successful, the control process then transfers to step S11. In step S11, the control values executed by the restoration plan are restored to their state when the malfunction occurred (the state during normal control of the photocopying machine). In step S12 the display unit 56 displays a message to the effect that restorative operation(s) by the auto-restoration process have failed. In step S13, the restorative results of the auto-restoration process, the information that the restorative operations have failed, and restoration trigger data (state monitoring data) indicating which of steps S1 through S3 determined that the restoration routine should be executed, are transmitted to the host computer 1 as fault data, and the control process ends.

If, however, it is determined that the auto-restoration process was successful, then the control process shifts from step S10 to step S15. In step S15 the display unit 56 displays the fact that the auto-restoration process is finished. The auto-restoration process herein is the maintaining of machine functionality by executing restorative operations. That is, the procedure does not accomplish complete restoration. Photocopying machine functions are thereby only restored so as to maintain machine operability. In contrast, faulty parts are not repaired or replaced.

In step S16, fault data is transmitted to the host computer 1, likewise as in step S13. In step S17, the copying operation is restarted.

Figure 6:
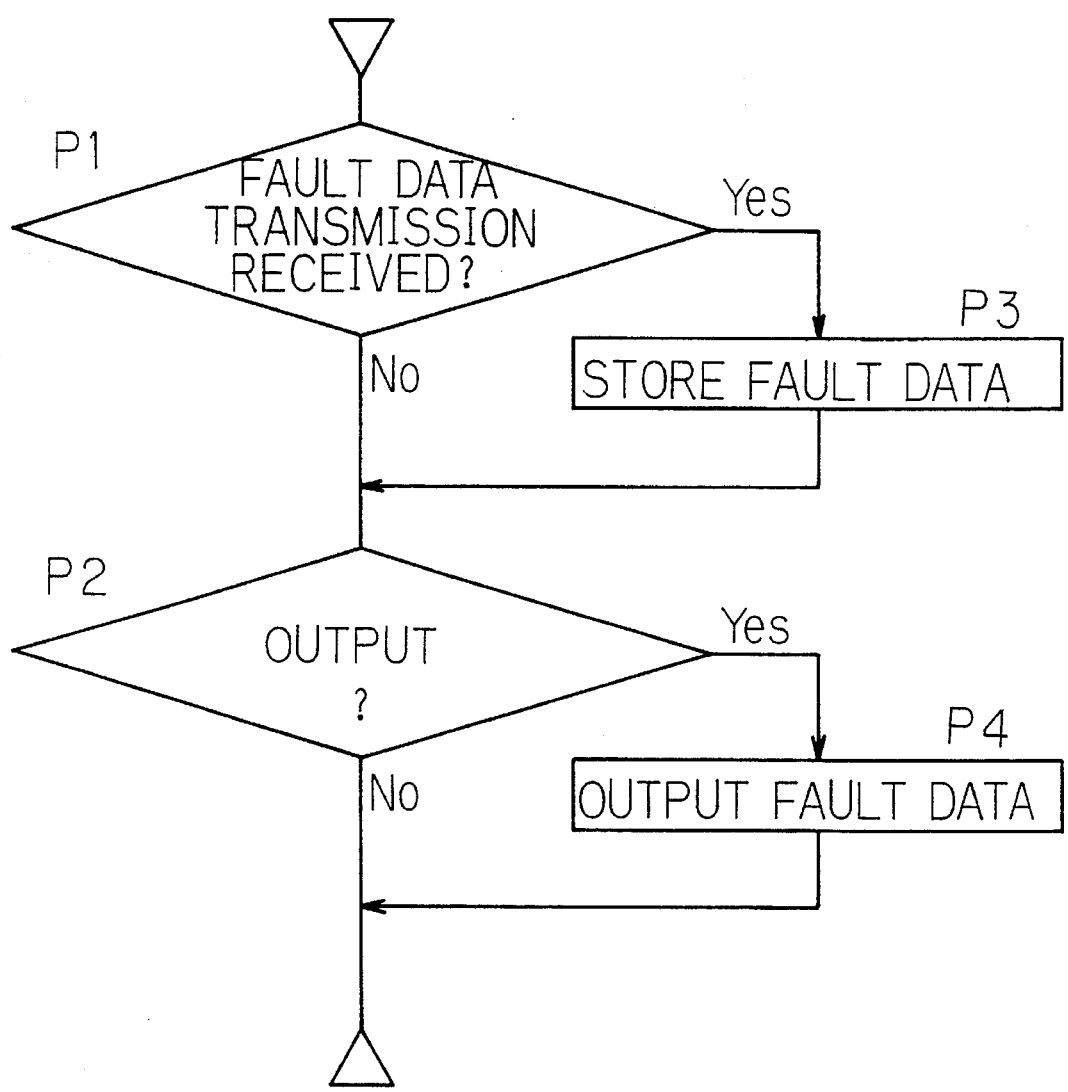
FIG. 6 is a control flow chart illustrating operations performed the host computer as indicated in FIGS. 1 and 2.

Meanwhile, the host computer 1 determines, in step P1 in the FIG. 6 flow-chart, whether fault data has been received. In step P2 it is determined whether an output command has been made. If it is determined that fault data has been received, then the control process transfers from step P1 to step P3. In step P3 the received fault data is stored in the RAM 5. If it is determined that an output command has been made, then the control process shifts from step P2 to step P4. In step P4 the fault data recorded in the RAM 5 for each photocopying machine is listed out in display or printed. From the fault data output accordingly, a service engineer is able to comprehend the photocopying machine condition and carry out maintenance work on the photocopying machines.

Herein, since it is judged from a remote location whether a faulty photocopying machine has been restored to operability by the auto-restoration capability, it is possible to grasp easily whether a photocopying machine in question is one in which functionality has been regained by auto-restoration. Further, by examining the fault data obtained via the host computer 1, it is possible to determine accurately the cause originating malfunction, meanwhile distinguishing photocopying machines whose functions have been regained by auto-restoration from otherwise faulty photocopying machines. This capability accordingly improves maintenance workability.

The present invention may also be applied to image reproducing apparatuses other than photocopying machines, for example page printers or facsimile devices.

In an image reproducing apparatus in accordance with the present invention, results interpreting the auto-restoration processes as well as the restoration condition are made available as display. Accordingly, a service engineer can recognize the cause of a malfunction accurately by examining the output results, and can repair the image reproducing apparatus readily even if a malfunction has occurred following restoration to functional operability by the machine's auto-restoration capability. This can facilitate the maintenance work.

Further in accordance with the present invention, in a network of auto-restoring capable image reproducing apparatuses which communicate with a host computer, the state of image reproducing apparatuses which have malfunctioned can be determined by the host computer. Accordingly, the fault(s) giving rise to the malfunction in an image reproducing apparatus in question can be recognized remotely. Maintenance work can be then be carried out having prepared replacement components in advance. This can further facilitate the maintenance work.

Moreover, in accordance with the present invention, image reproducing apparatuses having an auto-restoration capability are monitored constantly, such that fault detection can be performed accurately in the event of machine malfunction. In the network of the image reproducing apparatuses communicating with a host computer, the host computer accordingly can recognize that a fault has been detected. Thus the fault causing the malfunction can be recognized accurately, which can further facilitate subsequent maintenance work.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. An image reproducing system provided with an auto-restoration capability, comprising:

an image reproducing machine;

fault detecting means for detecting faults causing operational malfunction in said image reproducing machine;

auto-restoration means for preparing and executing an auto-restoration process implementing restorative operations to compensate functionally for machine faults detected by said fault detecting means;

a restoration process data storage means for storing restoration process data identifying an executed auto-restoration process;

a restorative operation success-interpreting means for interpreting as restorative state data success of restorative operations implemented by said auto-restoration means; and a display output means for displaying restoration process data from said restoration process data storage means and for displaying restorative state data from said restorative operation success-interpreting means.

2. An image reproducing system according to claim 1, further comprising a machine-condition monitoring means for monitoring image reproducing machine condition, wherein said fault detecting means is in communication with said machine-condition monitoring means such that said fault detecting means detects faults causing operational malfunction in said image reproducing machine based on machine-condition data from said machine-condition monitoring means.

3. An image reproducing system according to claim 2, said machine-condition monitoring means including said restorative operation success-interpreting means, wherein when said auto-restoration means implements restorative operations of an auto-restoration process, said machine-condition monitoring means generates restorative state data indicating whether the restorative operations are successful.

4. An image reproducing system according to claim 2, wherein said restorative operation success-interpreting means is exclusive of said machine-condition monitoring means.

5. An image reproducing system according to claim 1, wherein said image reproducing machine is communicable with a host computer in a network with image reproducing machines likewise provided with an auto-restoration capability, further comprising a communication means for transmitting output from said display output means to a host computer via a transmission line.

6. An image reproducing system according to claim 5, further comprising a machine-condition monitoring means for monitoring image reproducing machine condition, wherein said fault detecting means is in communication with said machine-condition monitoring means such that said fault detecting means detects faults causing operational malfunction in said image reproducing machine based on machine-condition data from said machine-condition monitoring means.

7. An image reproducing system according to claim 6, wherein said communication means is linked to said machine-condition monitoring means such that said communication means transmits data from said machine-condition monitoring means to the host computer when said fault detecting means detects faults.

8. An image reproducing system provided with an auto-restoration capability, comprising:

an image reproducing machine;

a main controller for directing image-reproducing operations of said image reproducing machine, for detecting faults causing operational malfunction in said image reproducing machine, for preparing and executing an auto-restoration process implementing restorative operations to compensate functionally for detected image-reproducing machine faults, and for interpreting as restorative state data success of restorative operations implemented by an executed auto-restoration process;

a restoration process data storage for storing restoration process data identifying an executed auto-restoration process; and a display for displaying restoration process data from said restoration process data storage, and for displaying restorative state data interpreted by said main controller.

9. An image reproducing system according to claim 8, further comprising machine-condition monitoring sensors in communication with said main controller, wherein said main controller detects faults causing operational malfunction in said image reproducing machine based on machine-condition data from said machine-condition monitoring sensors.

10. An image reproducing system according to claim 9, wherein said machine-condition monitoring sensors are in communication with said main controller such that whereupon said main controller executes an auto-restoration process implementing restorative operations, said main controller interprets data from said machine-condition monitoring sensors as restorative state data indicating whether the restorative operations are successful.

11. An image reproducing system according to claim 9, further comprising machine restorative state sensors in communication with said main controller such that when said main controller executes an auto-restoration process implementing restorative operations, said main controller interprets data from said machine restorative state sensors as restorative state data indicating whether the restorative operations are successful.

12. An image reproducing system according to claim 8, wherein said image reproducing machine is communicable with a host computer in a network with image reproducing machines likewise provided with an auto-restoration capability, further comprising a communication device for transmitting output from said display to a host computer via a transmission line.

13. An image reproducing system according to claim 12, further comprising machine-condition monitoring sensors in communication with said main controller, wherein said main controller detects faults causing operational malfunction in said image reproducing machine based on machine-condition data from said machine-condition monitoring sensors.

14. An image reproducing system according to claim 13, wherein said communication device is in communication with said main controller such that when said main controller detects faults through said machine-condition monitoring sensors, said communication device transmits data indicating operational malfunction in said image reproducing machine from said main controller to the host computer.

15. An auto-restoration method for an image reproducing system wherein image reproducing machines have an auto-restoration capability, comprising the steps of:

detecting faults causing operational malfunction in an image reproducing machine;

preparing and executing an auto-restoration process implementing restorative operations to compensate functionally for machine faults detected in said fault detecting step;

storing restoration process data identifying the executed auto-restoration process;

interpreting as restorative state data success of restorative operations implemented by said auto-restoration function; and displaying the restoration process data and the restorative state data.

16. An auto-restoration method according to claim 15, wherein said step of preparing and executing an auto-restoration process implementing restorative operations comprises the substeps of:

deriving candidate causes for the machine faults detected in said fault detecting step;

selecting fault models by performing a malfunction simulation based on the candidate causes;

preparing an auto-restoration plan, said substep of preparing an auto-restoration plan including
(a) determining restoration objectives from requirements not satisfied among manifest requirements for all necessary machine functions, the necessary machine functions having been selected in advance from among function models,
(b) selecting one of the restoration objectives, (c) deriving, in part from parameters among the fault models, candidate restorative operations to meet the selected restoration objective, (d) deriving by a simulation technique a restoration model of the image reproducing machine condition following execution of the selected candidate restorative operations, (e) repeating (b) through (d) so as to derive a restoration model for each restoration objective, (f) evaluating each restoration model and thereby selecting the candidate restorative operations fulfilling the most restoration objectives and having the least side effects.

17. An auto-restoration method according to claim 16, further comprising the step of continually monitoring image reproducing machine condition, wherein said step of detecting faults detects faults causing operational malfunction in the image reproducing machine based on machine-condition data generated during said step of continually monitoring image-reproducing machine condition.

18. An auto-restoration method according to claim 17, wherein said step of interpreting as restorative state data success of restorative operations is executed in response to data generated during said step of continually monitoring image reproducing machine condition, upon implementing the restorative operations executed in said step of preparing and executing an auto-restoration process.

19. An auto-restoration method according to claim 17, further comprising the step of monitoring machine restorative state upon implementing the restorative operations executed in said step of preparing and executing an auto-restoration process, wherein said step of interpreting as restorative state data success of restorative operations interprets data generated during said step of monitoring machine restorative state as restorative state data indicating whether the restorative operations are successful.

20. An auto-restoration method according to claim 16, said step of interpreting as restorative state data success of restorative operations further comprising the substep of directing the image reproducing machine to carry out an auto-check procedure for conditional monitoring of the machine functions, the auto-check procedure including test-executing restored machine functions as necessary to enable conditional monitoring.

21. An auto-restoration method according to claim 16, wherein the image reproducing machines having an auto-restoration capability are communicable in a network with a host computer, further comprising the step of transmitting to a host computer via a communication means and transmission line output generated during said step of displaying the restoration process data and restorative state data.

22. An auto-restoration method according to claim 21, further comprising the step of continually monitoring image I reproducing machine condition, wherein said step of detecting faults detects faults causing operational malfunction in the image reproducing machine based on machine-condition data generated during said step of continually monitoring image-reproducing machine condition.

23. An auto-restoration method according to claim 22, further comprising the step of enabling the communication means to transmit data generated during said-step of continually monitoring image-reproducing machine condition to the host computer when faults are detected during said step of detecting faults.

* * * * *